United States Patent
Engelsmann et al.

[15] 3,667,366
[45] June 6, 1972

[54] PHOTOGRAPHIC CAMERA WITH BUILT-IN RANGEFINDER

[72] Inventors: Dieter Engelsmann, Unterhaching; Dieter Maas, Munich; Rolf Schröder, Munich; Gerda Linke, Munich, all of Germany

[73] Assignee: Agfa-Gevaert Aktiengesellschaft, Leverkusen, Germany

[22] Filed: May 21, 1970

[21] Appl. No.: 39,306

[30] Foreign Application Priority Data

May 23, 1969 Germany.....................G 69 20 873.7

[52] U.S. Cl. ............................................................95/44 C
[51] Int. Cl. .......................................................G03b 3/08
[58] Field of Search ..................................................95/44 C

[56] References Cited

UNITED STATES PATENTS 2,151,124    3/1939    Leitz......................................95/44 C
2,273,355    2/1942    Hineline................................95/44 C
3,029,720    4/1962    Leitz et al. ...........................95/44 C Primary Examiner—Samuel S. Matthews
Assistant Examiner—E. M. Bero
Attorney—Michael S. Striker

[57] ABSTRACT

A photographic camera wherein a plastic camera body supports the metallic casing of a built-in rangefinder and a lens mount including a focussing ring whose rotation causes displacements of a movable optical element in the rangefinder casing by way of a gear train. A shaft of the gear train drives a rotary cam which displaces the movable optical element by way of one or more levers. Alternatively, the shaft of the gear train drives a threaded shaft which effects axial movements of a nut so that the latter pivots a lever which supports the movable optical element. The connection between the shaft of the gear train and the cam or nut is such that the shaft can move radially to compensate for eventual displacements of the lens mount with reference to the casing of the rangefinder.

9 Claims, 3 Drawing Figures

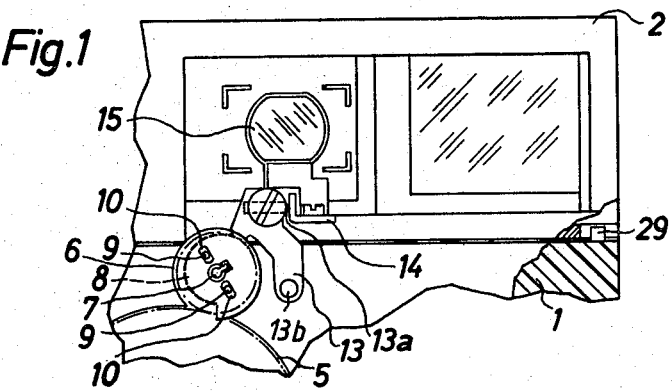
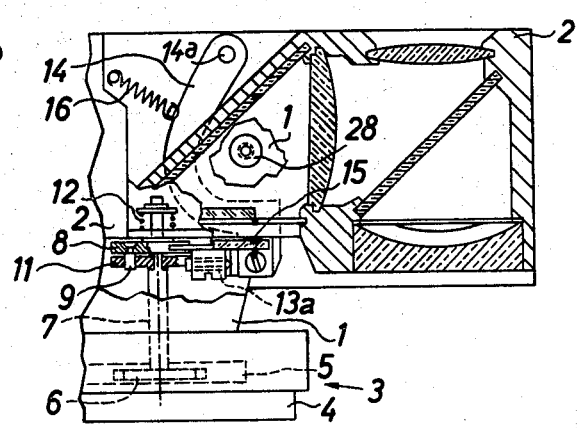
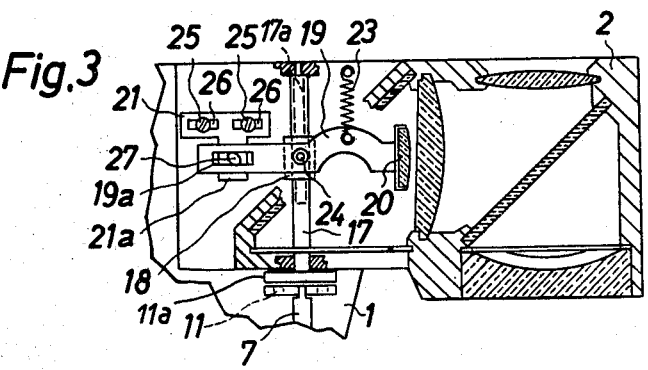

ot3,667,366

PHOTOGRAPHIC CAMERA WITH BUILT-IN RANGEFINDER

BACKGROUND OF THE INVENTION

The present invention relates to photographic cameras in general, and more particularly to improvements in photographic cameras with built-in rangefinders.

The bodies of many photographic cameras consist of synthetic plastic material which is less stable than the material of a metallic body. Problems arise when a rangefinder must be installed in a plastic camera body, especially in connection with the transmission of motion between the focussing member, which is usually installed on the lens mount, and the movable optical element of the rangefinder.

SUMMARY OF THE INVENTION

An object of the invention is to provide a photographic camera with a built-in rangefinder and to provide such camera with a novel and improved connection between the focussing means and the movable optical element of the rangefinder.

Another object of the invention is to provide a connection which is particularly suited for use in cameras having plastic bodies.

A further object of the invention is to provide a photographic camera wherein a prefabricated rangefinder can be installed in or on a plastic camera body and can be coupled with the focussing means in a novel and improved way so that the accuracy of its measurements is not unduly affected by fluctuations and/or other influences which are due to relatively low stability of a plastic camera body.

The invention is embodied in a photographic camera, particularly in a still camera, which comprises a camera body preferably consisting of synthetic plastic material, a lens mount carried by the camera body and comprising focussing means (e.g., a rotary focussing ring), a rangefinder carried by the camera body and including a displaceable optical element, and displacing means for the optical element including a movable input element (e.g., a rotary cam) operatively connected with the optical element and forming part of a gearing or gear train which further includes a portion for moving the input element in response to movement of the focussing means. The rangefinder preferably further includes a metallic casing which accommodates the movable optical element and is mounted in or on the camera body. The input element can be mounted on or in the metallic casing and the aforementioned portion of the gear train is preferably installed in the lens mount. Such portion of the gear train may include a ring gear which is connected to the focussing means, a pinion mating with the ring gear, and one or more shafts for transmitting torque from the pinion to the input element, preferably through the intermediary of an output element which transmits torque by way of pin-and-slot connections permitting radial displacements of the shaft with reference to the input element or vice versa.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary front elevational view of a still camera which embodies one form of the invention;

FIG. 2 is a partial plan and partial horizontal sectional view of the structure shown in FIG. 1; and FIG. 3 is a similar view of a second still camera.

DESCRIPTION OF THE PREFERRED EMBODIMENTS

Referring first to FIGS. 1 and 2, there is shown a portion of a still camera having a preferably plastic camera body 1 which supports a metallic casing 2 forming part of a rangefinder. The optical elements of the rangefinder are shown in FIG. 2; they include an optical element 15 which is displaceable about the pivot axis of a lever 14 fulcrumed in the casing 2, as at 14a. The front wall of the camera body 1 supports a lens mount 3 which is threadedly connected thereto in a manner not shown in the drawing. The focussing means includes a ring-shaped focussing member 4 which is rotatable about the optical axis of the objective and can operate a displacing unit which effects displacement of the optical element 15 in the rangefinder. The displacing unit includes a rotary input element here shown as a cam 8 which is mounted on the casing 2 of the rangefinder and forms part of a gearing or gear train which further includes a first portion serving to rotate the cam 8 in response to rotation of the focussing ring 4. The first portion of the gearing comprises a ring gear 5 which is coaxial with and connected to the focussing ring 4, a pinion 6 which mates with the ring gear 5, and a shaft 7 which is rotated by the pinion 6 and can rotate the cam 8 by way of a disk shaped output element 11 which is secured to the shaft 7. The connection between the disk 11 and the cam 8 includes radially extending slots 10 in the disk and pins 9 provided on the cam and extending into such slots so as to permit radial movement of the shaft 7 with reference to the axis of the cam 8. This compensates for eventual displacements of the lens mount 3 with reference to the camera body 1 and/or casing 2. In the embodiment of FIGS. 1 and 2, the shaft 7 is assumed to turn through about 330° when the focussing member 4 is moved from a first angular position to a second angular position, i.e., from a setting for closeups to a setting of infinity.

The cam 8 is biased by a torsion spring 12 which eliminates play between the teeth of the ring gear 5 and pinion 6. The driving connection between the lever 14 for the optical element 15 and the cam 8 comprises a follower 13 which is also a lever and whose arm tracks the face of the cam 8. The lever 13 is mounted on a pivot 13b carried by the metallic casing 2 of the rangefinder. An adjustable intermediate member 13a pivots the lever 14 in response to pivotal movement of the follower lever 13. A helical spring 16 is coupled to the lever 14; its function is to bias the follower lever 13 against the face of the cam 8 by way of the lever 14 and intermediate member 13a. Thus, the spring 16 eliminates play between the parts 8, 13, 13a, 14 of the second portion of the gearing of the displacing unit; these parts together form a step-down transmission of the displacing unit. The parts 5, 6, 7 and 9, on the other hand, constitute a step-up transmission of the displacing unit.

The coupling between the casing 2 and the camera body 1 comprises a sleeve 28 which is anchored in the camera body. A post 29 holds the casing 2 against uncontrolled angular movement. The casing 2 is preferably provided with a large flange or base which abuts against the adjacent portion of the camera body 1.

FIG. 3 illustrates a portion of a second still camera wherein the displaceable optical element 20 of the rangefinder is mounted on a lever 19. The manner in which the focussing ring 4 (not shown in FIG. 3) rotates the shaft 7 of the first portion of the gearing is the same as described in connection with FIGS. 1 and 2. The second portion of the gearing of FIG. 3 further comprises a second shaft 17 which is driven by the shaft 7 through the intermediary of a disk shaped output element 11 fixed to the shaft 7 and a disk shaped input element 11a fixed to the shaft 17. The driving connection between the disk 11, 11a comprises pins and slots similar to those shown in FIG. 1 (as at 9, 10) and permitting radial movements of the shaft 7 with reference to the shaft 17 or vice versa. The shaft 17 is provided with external threads 17a which mate with the internal threads of a nut 18 whereby the nut 18 moves axially in response to rotation of the shafts 7 and 17. The nut 18 carries a pivot 24 for the aforementioned lever 19. A helical spring 23 is coupled to the lever 19 and serves to eliminate play between the threads 17a and the internal threads of the nut 18.

The means for facilitating precise adjustments in the angular position of the lever 19 comprises a plate 21 which is movable at right angles to the axis of the shaft 17 and has parallel slots 26 for threaded pins or screws 25 mounted in the casing 2. A lug 21a of the plate 21 carries an eccentric 27 extending into an elongated slot 19a of the lever 19. The position of this lever can be adjusted by shifting the plate 21 and/or by changing the angular position of the eccentric 27. When the focussing ring 4 rotates the shaft 7 by way of the gears 5, 6 (not shown in FIG. 3), the disks 11, 11a rotate the shaft 17 which causes the nut 18 to move axially and to thereby pivot the lever 19 about the eccentric 27; this causes the optical element 20 to move with reference to other optical elements of the rangefinder.

The parts 17, 18, 24 constitute a step-down transmission of the gearing of the displacing unit shown in FIG. 3.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a camera body at least the major part of which consists of synthetic plastic material; a lens mount carried by said body and including a movable focussing member; a rangefinder including a casing carried by said body and a displaceable optical element mounted in said casing, at least the major part of said casing consisting of a metallic material; and means for displacing said optical element with respect to said casing in response to movement of said focussing member, including a gearing having a first portion mounted in said lens mount and having an output element and a second portion mounted in said casing and having an input element receiving motion from said output element, at least one of said elements having limited freedom of movement with respect to the other element in order to compensate for eventual distortion of said synthetic plastic material, said first and second portions of said gearing being respectively arranged to increase and reduce the velocity ratio between said focussing member and said optical element.

2. A combination as defined in claim 1 further comprising coupling means including a sleeve connecting said casing to said camera body.

3. A combination as defined in claim 1, wherein said first portion of said gearing further comprises a ring gear connected with said focussing member, a pinion mating with said ring gear, and a shaft receiving torque from said pinion and arranged to transmit motion to said output element.

4. A combination as defined in claim 1, wherein said input element comprises a cam mounted on said casing.

5. A combination as defined in claim 1, further comprising a pin-and-slot connection provided between said output element and said input element to permit limited radial movements of at least one of said input and output elements with reference to the other element.

6. A combination as defined in claim 1, wherein said input element comprises a cam rotatable about a predetermined axis and said first portion of said gearing further comprises a shaft arranged to rotate in response to movement of said focussing member and to transmit torque to said output element.

7. A combination as defined in claim 1, wherein said first portion of said gearing further comprises a first shaft arranged to rotate in response to movement of said focussing member and said second portion of said gearing further comprises a second shaft operatively connected with said optical element, said input element cooperating with said output element to rotate said second shaft in response to rotation of said first shaft.

8. A combination as defined in claim 7, wherein said output and input elements are respectively secured to said first and second shafts and further comprising a pin-and-slot connection provided between said output element and said input element to permit limited radial movements of at least one of said output and input elements with respect to the other element.

9. A combination as defined in claim 7, wherein said second shaft is provided with external threads and said second portion of said gearing further comprises a nut mating with said second shaft and arranged to move axially in response to rotation of said second shaft and lever means supporting said optical element and arranged to pivot in response to axial movement of said nut.

* * * * *